Aug. 20, 1957 C. P. SMITH 2,803,111
HYDRAULIC SERVO SYSTEMS
Filed April 4, 1955 5 Sheets-Sheet 2

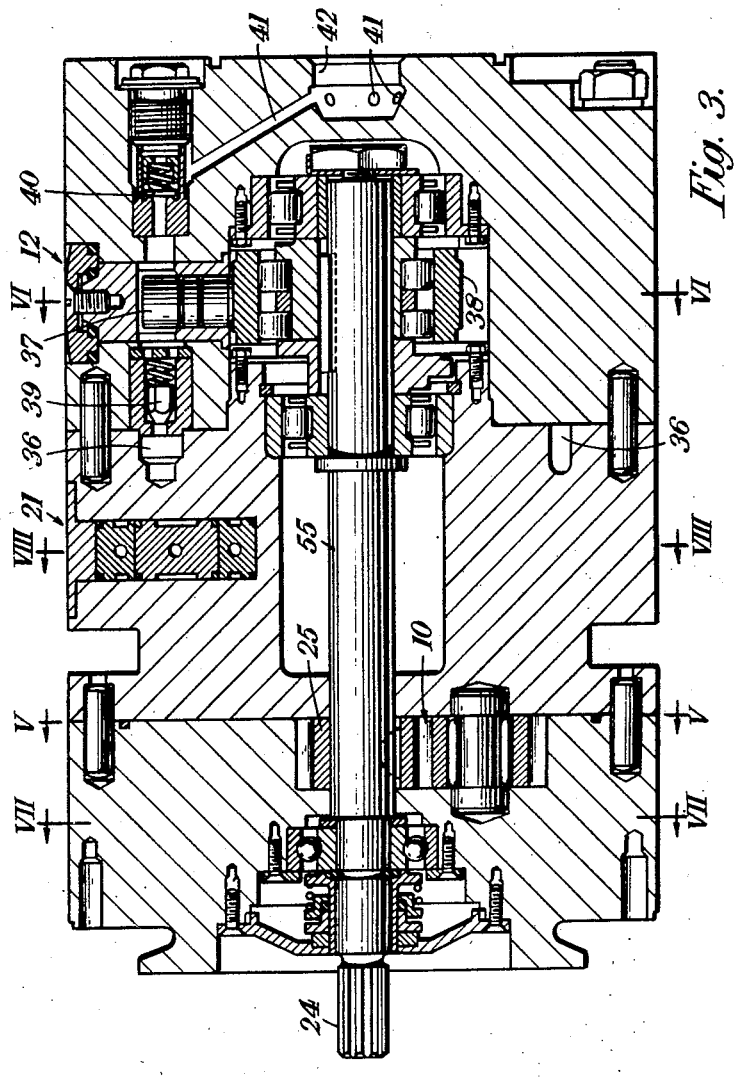

United States Patent Office
2,803,111
Patented Aug. 20, 1957

2,803,111

HYDRAULIC SERVO SYSTEMS

Charles Philip Smith, Riversdale, Ramsay, Isle of Man, assignor to H. M. Hobson Limited, London, England, a British company Application April 4, 1955, Serial No. 499,175

Claims priority, application Great Britain April 20, 1954

4 Claims. (Cl. 60—52)

This invention relates to hydraulic servo systems of the type comprising a variable-delivery two-stage hydraulic pump and a hydraulic actuator, i. e. a hydraulic motor or jack, operated by liquid supplied to it by the pump under the control of a relay valve.

In existing servo systems of this type, the pressure dissipated across the relay valve is the difference between the pressure available from the pump and the pressure required by the output load on the hydraulic actuator. This involves a considerable wastage of power when the pump pressure is high and the output load small. Also the valve opening required to pass a given volume of liquid varies with the output load on the system.

The invention provides a hydraulic servo system of the above type which includes, for controlling the flow of liquid from the first to the second stage of the pump, an off-loading valve subject to the pressure drop across the relay valve and normally balanced against said pressure drop by a relatively light spring, the off-loading valve serving to reduce the flow of liquid to the second stage of the pump in response to increase in said pressure drop and thereby to maintain said pressure drop substantially equal to the load of the spring.

With the system according to the invention therefore, the pressure drop across the relay valve is limited to a relatively small amount (e. g. 500 p. s. i.) required to maintain stiffness in the system. Accordingly the power wasted is small, the system operates efficiently at low output loads and the extent of opening of the relay valve required to pass a given volume of liquid, and therefore to maintain a given output velocity, remains constant and independent of the output load.

Preferably the off-loading valve is a waisted piston valve, subjected at one end to the delivery pressure of the second stage of the pump (i. e. the pressure on the upstream side of the relay valve) and at the other to the hydraulic pressure at the downstream side of the relay valve, liquid flowing from the first to the second stage of the pump through the waisted portion of the off-loading valve which is arranged to move against its spring to reduce the flow of liquid to the second stage of the pump and pass some of the delivery of the first stage to exhaust when the pressure drop across the relay valve overpowers the spring.

Preferably the pump is of the constant work type and includes, in series with the aforesaid lightly loaded off-loading valve and between the two stages of the pump, a second and more heavily loaded off-loading valve of the character described in British specification No. 582,182, and United States Patents Nos. 2,643,613 and 2,653,543.

The invention is applicable both to open and to closed loop servo systems, and in the latter case a follow-up mechanism is provided to return the relay valve to its neutral position when the hydraulic actuator has moved the output member of the system to the position determined by the initial displacement of the relay valve.

One specific embodiment of hydraulic servo system according to the invention will now be described in more detail, by way of example, with reference to the drawings, in which:

Fig. 3 is a vertical section through the pump,

Figure 1:
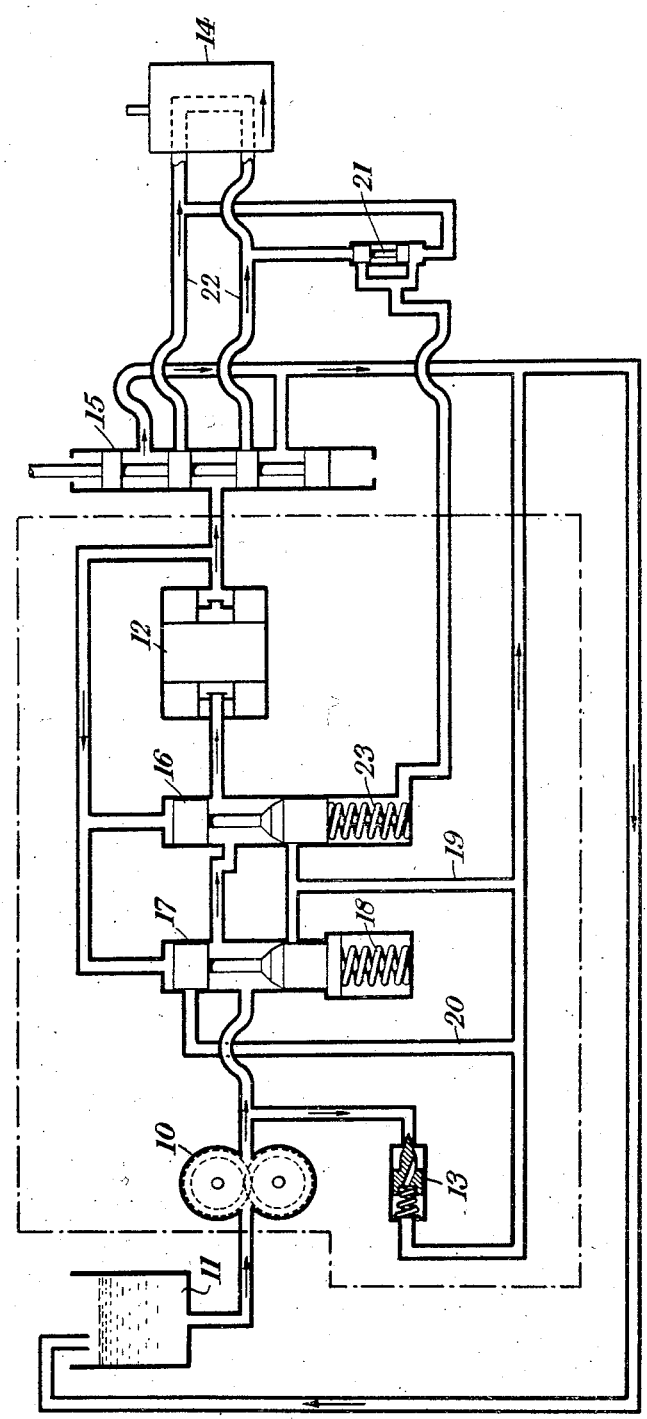
Fig. 1 is a diagram showing the layout of the servo system.

Like reference numerals denote like parts throughout the figures and the invention will first be described with reference to the diagrams of Figs. 1 and 2.

The pump, which is of the general character described in United States Patent No. 2,653,543, comprises a first gear wheel stage 10, drawing liquid from a reservoir 11, and a second plunger stage 12 capable of delivering liquid at high pressure. The first stage of the pump includes a low pressure relief valve 13 for limiting the first stage delivery pressure to a value sufficient to give complete filling of the cylinders of the second stage plus a suitable margin. The second stage 12 of the pump supplies liquid to a hydraulic actuator 14 (i. e. a hydraulic motor or jack) via a relay valve 15. The second stage 12 of the pump contains a multiplicity of pistons which may be driven by a cam, eccentric or swash plate. The porting may be controlled by separate piston valves, by a rotary valve suitably phased or by spring loaded inlet and delivery non-return valves. The pistons may be free, in which case their stroke is controlled by the flow of liquid from the first stage through the inlet valves, or constrained, in which case a degree of cavitation will be caused when working at less than full delivery. This stage of the pump may best be considered as a pressure amplifier. It raises the pressure of the liquid to a value determined by the output load on the hydraulic actuator 14 acting through a control pressure off-loading valve 16 or through a limiting pressure off-loading valve 17 as described below. The relay valve 15 is an orthodox four land valve which, according to the direction of its movement from the neutral position shown, determines the direction of operation of the hydraulic actuator 14. The velocity of the hydraulic actuator 14 is controlled by the amount of movement of the relay valve 15 from its neutral position. As will readily be understood, in a unidirectional system the valve 15 will be replaced by a similar valve having three lands only.

Figure 2:
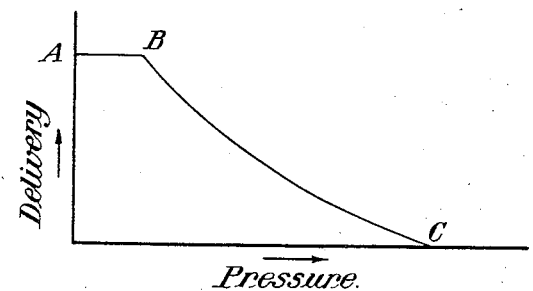
Fig. 2 is a graph showing the characteristics of the pump.

The limiting pressure off-loading valve 17, which is balanced against the delivery pressure of the pump by a spring 18 of heavy loading, e. g. 3000 p. s. i., operates as described in United States Patent No. 2,653,543, to provide the limiting constant work envelope characteristic indicated by the line A B C in Fig. 2. As will be seen, over the range B C of this characteristic, the product of the delivery of the pump, in gallons per minute, and the delivery pressure is substantially constant. The valve 17 acts by a combination of by-passing the first stage delivery back to the reservoir 11 through a conduit 19 and throttling the supply of liquid passed to the second stage of the pump. It also acts as a final high pressure relief valve, spilling the pump delivery back to the reservoir 11, through a conduit 20 if the pump delivery pressure exceeds a given maximum.

The control pressure off-loading valve 16, which is in series with the valve 17, is acted upon at one end by the pump delivery pressure and at the other end by the pressure at the inlet to the hydraulic actuator 14, which is a function of the output load of the actuator 14. The latter pressure is applied to the valve 16 through a shuttle valve 21 which, of course, is not required in a unidirectional system. The shuttle valve 21 selects the higher of the two pressures in the actuator feed lines 22 and applies it to the base of the valve 16. The valve 16 is balanced against the hydraulic pressure difference across it by a relatively light spring 23, the loading of which may, for example, be 500 p. s. i. The valve 16 acts by a combination of by-passing first stage delivery back to the reservoir 11 through the conduit 19 and throttling the supply of liquid passed to the second stage 12.

The operation of the system is as follows:

The first stage gear pump 10 draws liquid from the reservoir 11 and passes it through the limiting pressure off-loading valve 17 and the control pressure off-loading valve 16 to the second stage plunger pump 12. Here the pressure of the liquid is raised to a value determined by the output load on the actuator 14 acting through the shuttle valve 21 and the control pressure off-loading valve 16 plus the pressure drop across the relay valve 15. From the second stage plunger pump 12 the liquid passes through the relay valve 15 to the actuator 14.

The system necessarily operates within the limiting envelope A B C (Fig. 2) of pressure and delivery determined by the limiting pressure off-loading valve 17 and the pressure drop across the relay valve 15 will be approximately constant and will be determined by the load of the spring 23.

The functioning of the system may best be considered by examining three operating conditions. These are:

1. Maximum output.
2. Zero output.
3. An intermediate condition.

1. Maximum output presupposes that the relay valve 15 is wide open in one direction. In this condition there is little or no pressure drop across it, hence the control pressure off-loading valve 16 will be held in its top position by its spring 23 and will not influence the operation of the servo mechanism in any way.

The delivery of the pump will be solely controlled by the limiting pressure off-loading valve 17, whose position is determined by the pump delivery pressure which will depend on the load on the actuator 14. Hence the actuator may be stalled at maximum torque or running at maximum speed at no load or at any intermediate point on the limiting envelope curve A B C (Fig. 2).

2. Zero output. Under this condition the relay valve 15 will be closed, and the valve 16 will restrict the pump output pressure to the value (e. g. 500 p. s. i.) determined by the loading of the spring 23. The delivery of the pump at this pressure will be that required to compensate for any leakage in the relay valve 15 and in the actuator 14.

3. Operation at an intermediate condition. The velocity and load of the actuator are such that the pump pressure and delivery lie within the envelope of the curve A B C (Fig. 2). The relay valve 15 is partially open, and the pressure drop across it is maintained at the normal 500 p. s. i. by the control pressure off-loading valve 16. The limiting pressure off-loading valve 17 will not influence the system unless the load on the actuator 14 increases until the pump pressure approaches within 500 p. s. i. of the curve A B C. At this point the two valves 16, 17 will begin to share the control and the pressure across the relay valve 15 will begin to drop.

While the control pressure off-loading valve 16 is determining the delivery, the pressure across the relay valve 15 will remain approximately constant (depending on the rate of the spring 23) and the velocity of the actuator 14 will be controlled by the position of the relay valve 15 only and will be independent of load.

The practical form of hydraulic pump shown in Figs. 3–8 will now be described. This is very similar to that described in United States Patent No. 2,653,543, but the pump casing includes, in addition, the lightly loaded off-loading valve 16 and the shuttle valve 21. The ducts by which liquid flows through the pump casing are generally indicated in Figs. 3–8 but are shown in great detail in the drawings of United States Patent No. 2,653,543.

Figure 6:
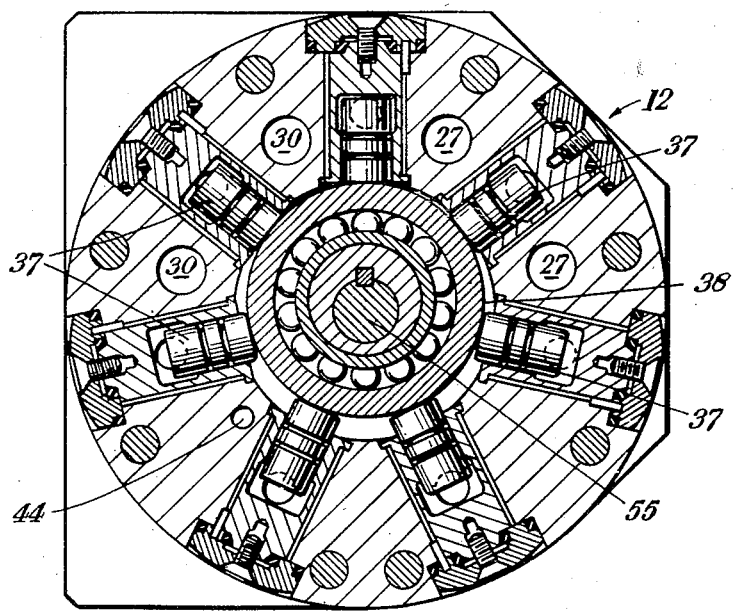
Figs. 5–8 are respectively sections taken on the lines V—V, VI—VI, VII—VII and VIII—VIII in Fig. 3.
Figure 4:
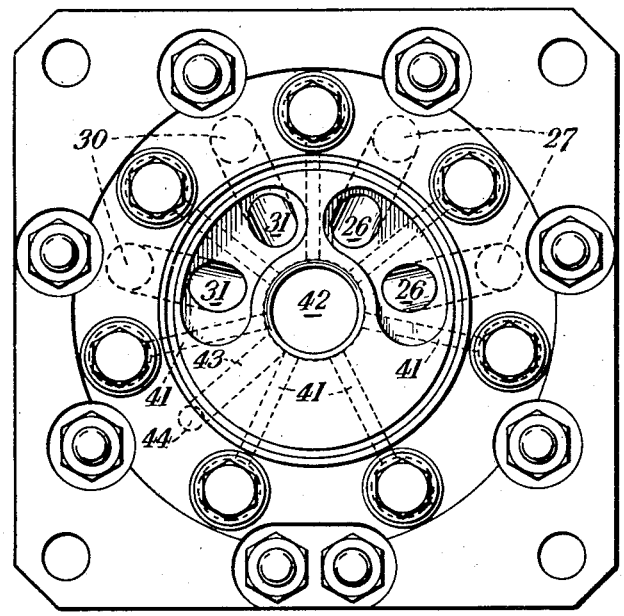
Fig. 4 is an end-elevation looking from the right hand side of Fig. 3.
Figure 5:
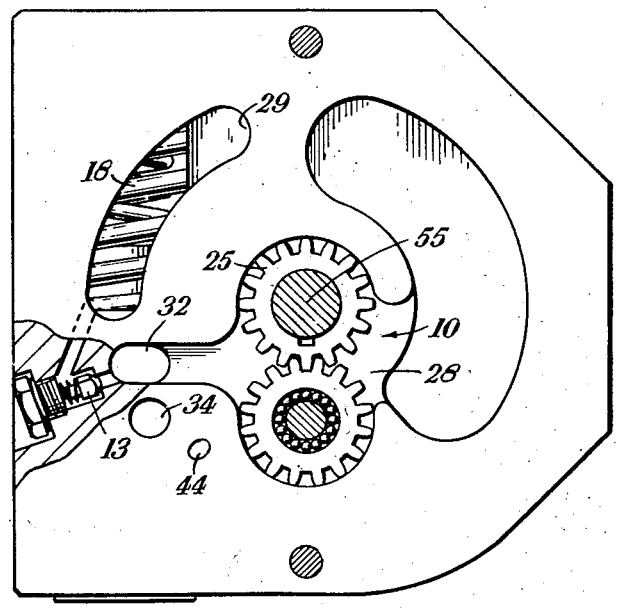

As most clearly seen in Figs. 3 and 6, the pump is driven by a shaft 55 formed with splines 24 by which it is driven from a suitable prime mover and carrying the driving gear 25 of the first or gear stage 10 of the pump. Liquid enters the pump casing through inlets 26 (Fig. 4) and passes from the inlets through ducts 27 to the inlet 28 (Fig. 5) of the gear stage 10. Part of the delivery of the gear stage passes, via the relief valve 13, to a duct 29 communicating, via ducts 30 (Fig. 6) with exhaust outlets 31 (Fig. 4). The remainder of the liquid delivered by the gear stage 10 passes through a duct 32, the waisted portion 33 (Fig. 7) of the valve 17, a duct 34 (Fig. 5) and the waisted portion 35 (Fig. 8) of the valve 16 to an annular duct 36 (Fig. 3) constituting an inlet to the second or piston stage 12 of the pump.

As indicated in Fig. 6, the piston stage comprises seven radially arranged pistons 37 which are driven on their delivery strokes by an eccentric 38 on the shaft 55. The pistons 37 are returned by the pressure of liquid supplied to them by individual inlet valves, one of which is shown at 39 in Fig. 3. Liquid is discharged from each cylinder of the piston stage of the pump through a discharge valve 40 and a passage 41 to a high pressure outlet 42. Liquid at pump delivery pressure also passes through a passage 43 (Fig. 4), to a duct 44 (Figs. 4 and 6) communicating with spaces 45 (Fig. 8) and 46 (Fig. 7) disposed respectively beneath the valve 16 and beneath the valve 17. A port 47 (Fig. 8) associated with the valve 16 and a port 48 (Fig. 7) associated with the valve 17 communicate with the exhaust ducts 30.

Figure 7:
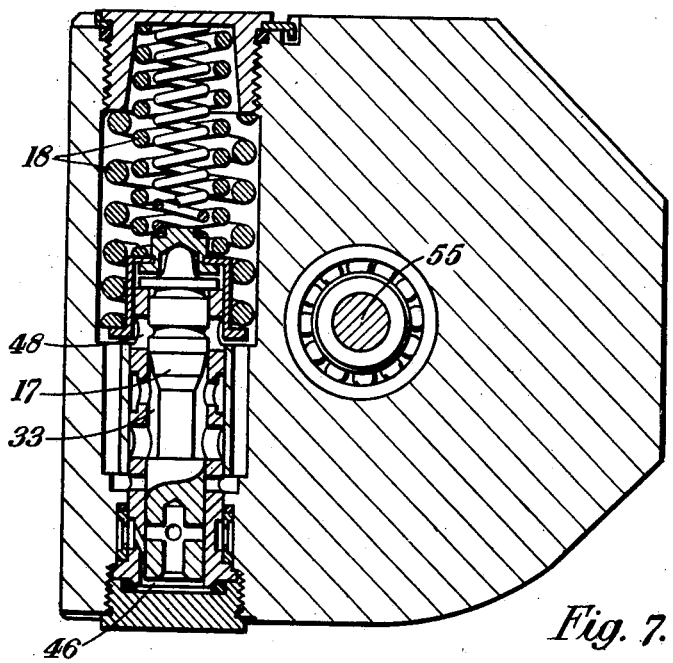
Figure 8:
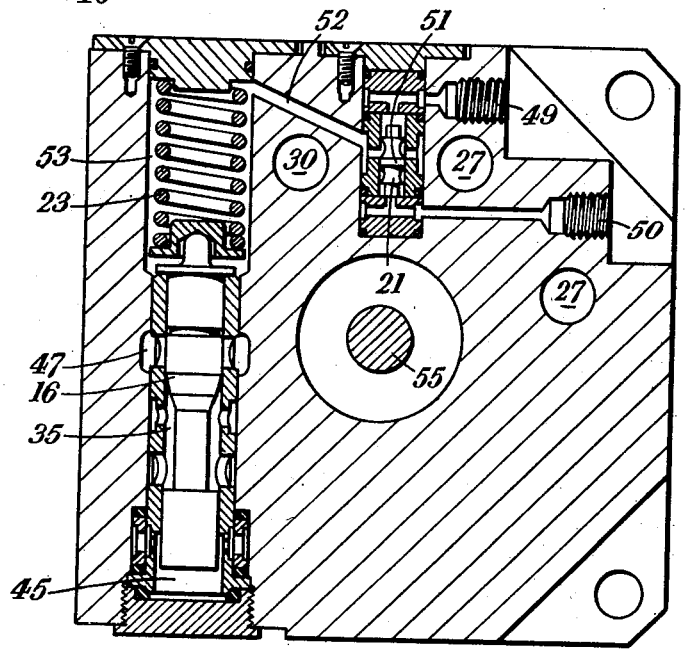

The valves 16, 17 are shown in Figs. 8 and 7 respectively in the fully open position. They move, when their springs 23, 18 are overpowered, to control the action of the pump as already described with reference to Figs. 1 and 2. The shuttle valve 21 (Fig. 8) is associated with two inlets 49, 50 for connection to the opposite sides of the actuator 14 (Fig. 1). When the pressure at the inlet 49 exceeds that at the inlet 50, the shuttle valve 21 occupies the position shown in Fig. 7. Its land 51 then cuts off a duct 52 from the inlet 50 and liquid at the pressure prevailing at the downstream side of the relay valve 15 (Fig. 1) is then supplied from the inlet 49, via the duct 52, to the space 53 above the valve 16. When the pressure at the inlet 50 exceeds that at the inlet 49, the shuttle valve 21 moves up, to a position in which its land cuts off the duct 52 from the inlet 49 and allows liquid to pass from the inlet 50 to the space 53.

What I claim as my invention and desire to secure by Letters Patent is:

1. A hydraulic servo system comprising a variable-delivery hydraulic pump having first and second stages, a hydraulic actuator, a relay valve between said pump and said actuator for controlling the supply of liquid under pressure from the second stage of said pump to said actuator, an off-loading valve between the first and second stages of the pump for controlling the flow of liquid from said first stage to said second stage, conduits for subjecting said off-loading valve to the hydraulic pressure drop across said relay valve, and a relatively light spring normally balancing said off-loading valve against said pressure drop, said off-loading valve moving against said spring to reduce the flow of liquid to the second stage of the pump in response to increase in said pressure drop.

2. A hydraulic servo system comprising a variable-delivery hydraulic pump having first and second stages, a hydraulic actuator, a relay valve between said pump and said actuator for controlling the supply of liquid under pressure from the second stage of said pump to said actuator, a waisted piston valve between the first and second stages of the pump for controlling by variable passage of liquid through its waisted portion the flow of liquid from said first stage to said second stage, conduits for subjecting one end of said piston valve to the delivery pressure of the second stage of the pump and the other end of said piston valve to the hydraulic pressure at the downstream side of said relay valve, and a relatively light spring for balancing said piston valve against the hydraulic pressure difference across it, said piston valve moving in response to variations in said pressure difference to vary the flow of liquid to the second stage of the pump and thereby to maintain said pressure difference at a substantially constant value.

3. A hydraulic servo system comprising a variable-delivery hydraulic pump having first and second stages, a hydraulic actuator, a relay valve between said pump and said actuator for controlling the supply of liquid under pressure from the second stage of said pump to said actuator, a pair of off-loading valves disposed in series between the first and second stages of said pump for controlling the flow of liquid from said first stage to said second stage, conduits for subjecting one of said off-loading valves to the hydraulic pressure drop across said relay valve, a relatively light spring for normally balancing said off-loading valve against said pressure drop, said off-loading valve moving in response to variations in said pressure drop to vary the flow of liquid to the second stage of the pump and thereby to maintain said pressure drop substantially constant, a conduit for subjecting the other off-loading valve to the delivery pressure of the second stage of the pump, an exhaust port associated with said other off-loading valve and a heavier spring normally maintaining said other off-loading valve in position to close said exhaust port, said other off-loading valve restricting the flow of liquid to the second stage of the pump to limit the delivery pressure of said second stage and moving, when said delivery pressure becomes excessive, to open said exhaust port to permit liquid delivered by said first stage to flow to exhaust.

4. A hydraulic servo system according to claim 8, comprising two feed lines connecting said relay valve to said actuator and arranged to be connected alternatively to the delivery pressure of the second stage of the pump and to exhaust according to the direction of movement of said relay valve and a shuttle valve, responsive to the pressure difference in said feed lines, for applying to said piston valve the higher of the two pressures prevailing in said feed lines.

References Cited in the file of this patent

UNITED STATES PATENTS

| | | |
|---|---|---|
| 2,642,804 | Bowers | June 23, 1953 |
| 2,643,613 | Westbury | June 30, 1953 |
| 2,653,543 | Mott | Sept. 29, 1953 |